Feb. 3, 1925.

J. A. PURVES ET AL

OIL CUP

Filed Jan. 15, 1921

1,525,045

John A. Purves
William C. Purves
John M. Purves
INVENTORS.

BY

Parsons & Bodell
ATTORNEYS

Patented Feb. 3, 1925.

1,525,045

UNITED STATES PATENT OFFICE.

JOHN A. PURVES, WILLIAM C. PURVES, AND JOHN M. PURVES, OF SYRACUSE, NEW YORK.

OIL CUP.

Application filed January 15, 1921. Serial No. 437,396.

*To all whom it may concern:*

Be it known that we, JOHN A. PURVES, WILLIAM C. PURVES, and JOHN M. PURVES, residents of Syracuse, in the county of Onondaga and State of New York, have invented a certain new and useful Oil Cup, of which the following is a specification.

This invention relates to oil cups of the type in which a rotary delivery or valve member, as a ball, is seated at the lower end of the stem to roll on the part being lubricated, and has for its object a particularly simple and efficient construction by which the stem can be adjusted endwisely to conform to the depth of the hole in which the stem is mounted so that the delivery member will not be pressed too tightly against the moving part as a shaft to be lubricated as the stem of the oil cup is forced or screwed in such hole; and it further has for its object a particularly simple and efficient construction by which the reservoir can be readily refilled.

The invention consists in the combinations and constructions hereinafter set forth and claimed.

In describing this invention, reference is had to the accompanying drawing in which like characters designate corresponding parts in all the views.

Figures 1, 2:
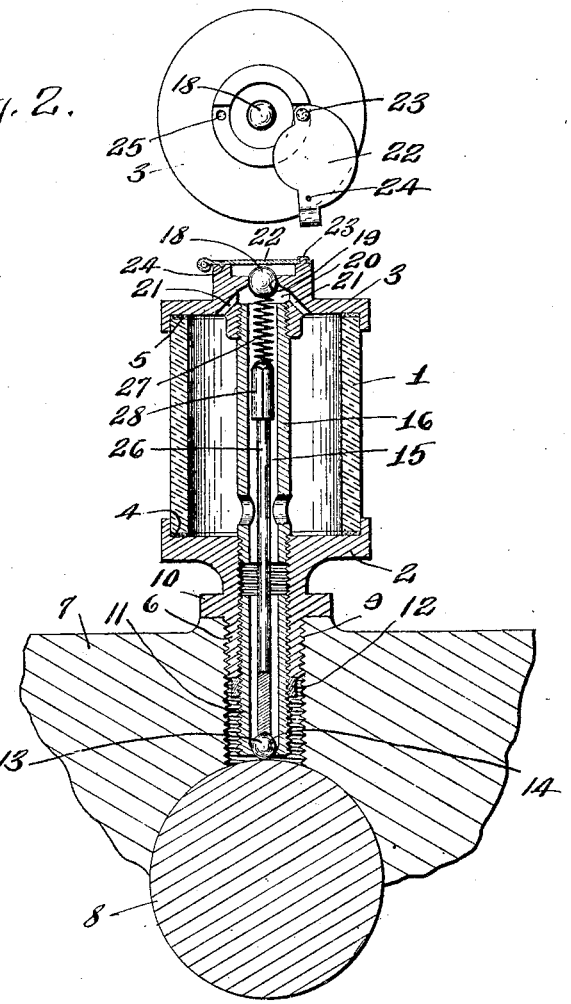
Figure 1 is a central vertical sectional view of an oil cup embodying our invention.
Figure 2 is a plan view of the cup, the cover being shown as swung out of operative position.

This oil cup comprises, generally, a receptacle having a stem for attachment to a support, and including a tubular extension projecting beyond the end of the stem proper, the extension being adjustable axially of the stem proper to conform to the depth of the hole in which the stem is mounted, a rotary delivery member seated in the end of the stem or the extension thereof and projecting beyond the advance end of the extension in position to engage a rotary part as the shaft journaled in the bearing in which the stem is supported, and means tending to hold the delivery member on its seat. The adjustable stem feature is capable of use with or without the delivery member.

1 designates the reservoir which may be, and usually is, a tubular or cylindric wall of glass held between a base 2 and a head 3, the base and head being usually formed with seats or recesses 4, 5 on their opposing sides in which the margins of the cylindric wall 1 extends, and suitable gaskets, are interposed between the edges of the cylindric wall and the seats or bottoms of the recesses. The base 2 is formed with a stem 6 for attachment to a support 7 as a bearing in which a part as a shaft 8 is to be lubricated is journaled, the stem proper being externally threaded at 9 and turning in a threaded hole in the support 7 and being also formed with a suitable wrench hold 10.

11 is the stem extension extending into the bore of the stem proper 6 and adjustable axially thereof, it being here shown as externally threaded and turning in the threaded bore of the stem proper 6. Preferably, means is provided for holding the stem extension in its adjusted position, and as here shown means operable from the outside of the stem proper and its extension is employed, this means being here illustrated as a nut 12 threading on the projecting end of the stem extension 11 and against the end face of the stem proper, the nut being of less diameter than the stem proper in order to pass into the hole in which the stem proper threads.

13 is a rotary delivery member which seats on an internal seat 14 at the lower end of the extension 11 and which projects beyond the advance end of the extension in position to engage the periphery of the shaft 8 or other part to be lubricated. The delivery member is here shown as a ball. The ball 13 is pressed outwardly against its seat 14 by spring pressed means to be presently described.

In operation, the turning of the ball delivers or feeds the oil to the bearing and prevents too rapid flow of the lubricant and in order that the ball may not be pressed so tightly against the shaft 8 as to prevent turning of the ball, the stem extension can be adjusted axially of the stem proper so that the entire stem is the right length for the threaded hole of the support 7 in which the stem is mounted.

The head 3 is formed with a filling passage 15 located centrally thereof and alined with the bore of the stem 6, which bore opens through the upper face of the base 2. The base 2 and head 3 are held together and clamped onto the ends of the cylindric wall by means of a tube 16 threading at its ends into the head 3 and into the bore of the stem 6 or the portion thereof opening through the base 2. This tube is provided with suitable perforations along its length through which oil being filled into the passage 16 can enter the receptacle and also through which the oil can feed from the receptacle back into the tube and out through the stem 6.

The outer end of the filling passage is normally closed by a spring pressed valve as a ball 18 normally held against its internal seat 19 at the upper end of the filling passage and the passage directly below the ball is recessed or widened at 20 in order that the oil may be delivered more easily from a can into the receptacle 1. Passages 21 connect the interior of the receptacle with the recess 20. Usually, to prevent the accumulation of dust around the ball 18 a cover 22 is provided for the outer end of the passage, this cover being here shown as pivoted at 23 on a vertical axis at one end and as having a projection 24 at its other end which snaps by the inherent resiliency of the metal of the cover into a depression 25 in the edge of the wall around the upper end of the filling passage.

In the illustrated form of our invention, means common to both the delivery member or ball 13 and the valve or ball is used for pressing them toward their seats, this means extending lengthwise of the tube 16 and including a spring.

As here shown, this means consists of a rod 26 and a spring 27 interposed between one end of the rod and one of the balls. The rod is of considerable less diameter than the bores of the tube 16 and stem 6 and in the illustrated oil cup rests at its lower end on the ball 13 and has a head 28 at its upper end located near the head 3 of the cup. The coiled compression spring 27 is interposed between the head 28 and the valve or ball 18.

This oil cup, in addition to its adjustable stem feature is particularly advantageous in that, owing to the relative arrangement of the means for holding the base and cap together, and to the means common to both the inlet valve 8 and the delivery member 13 for seating them, it consists of a minimum number of compactly arranged and easily accessible parts, and further owing to the passages 21 the oil feeds through the tube to the bearing when the cup is used on a revolving element, and the oil is thrown centrifugally to the outer end of the cup, and forced through the passages and thence through the tube.

What we claim is:

1. An oil cup comprising a receptacle, a base formed with a hollow stem, a head formed with a filling passage, a perforated tube connecting the head and the base and having its bore alined and communicating with the filling passage and the bore of the stem, outwardly extending ducts connecting the outer end of the receptacle and the passage on the head whereby oil thrown centrifugally from the receptacle passes through said ducts into the passage of the head and into the tube, a valve in the head above said ducts, a rotary delivering member at the lower end of the stem, a rod extending lengthwise of the stem and the tube and thrusting at its lower end against the delivery member and a spring inserted between the outer end of the rod and said valve, substantially as and for the purpose described.

2. An oil cup comprising a receptacle, a base formed with a hollow stem having an extension adjustable axially thereof, a head formed with a filling passage, a perforated tube connecting the head and the base and having its bore alined and communicating with the filling passage and the bore of the stem, the head being formed with outwardly extending ducts connecting the receptacle and the filling passage whereby oil thrown centrifugally from the receptacle passes through the duts into the passage of the head, and into the tube, a valve located in the head above said ducts, a rotary delivery member arranged at the lower end of the axially adjustable extension, a rod located in the stem and the extension and extending into the tube and a spring between the outer end of the rod and the valve, substantially as and for the purpose specified.

In testimony whereof, we have hereunto signed our names, at Syracuse, in the county of Onondaga and State of New York, this 25th day of June, 1920.

JOHN A. PURVES.
WILLIAM C. PURVES.
JOHN M. PURVES.